United States Patent [19]

Tsuboi et al.

[11] Patent Number: 4,985,784
[45] Date of Patent: Jan. 15, 1991

[54] IMAGE DATA TRANSFER METHOD AND APPARATUS THEREFOR

[75] Inventors: Yukitoshi Tsuboi, Yokohama; Teiji Okamoto, Fujisawa, both of Japan

[73] Assignee: Hitachi, Ltd., Tokyo, Japan

[21] Appl. No.: 305,702

[22] Filed: Feb. 3, 1989

[30] Foreign Application Priority Data

Feb. 5, 1988 [JP] Japan .................................. 63-23673

[51] Int. Cl.$^5$ .......................... H04N 5/76; H04N 7/13
[52] U.S. Cl. ..................................... 358/342; 358/136;
 358/335; 360/33.1; 360/39; 369/59; 369/44.11
[58] Field of Search .................... 358/136, 335, 342;
 360/33.1, 39, 40; 369/59, 44.11

[56] References Cited

U.S. PATENT DOCUMENTS

| | | | |
|---|---|---|---|
| 4,302,775 | 11/1981 | Widergren et al. | 358/136 |
| 4,394,774 | 7/1983 | Widergren et al. | 358/136 |
| 4,704,628 | 11/1987 | Chen et al. | 358/136 |
| 4,729,043 | 3/1988 | Worth | 358/342 |

*Primary Examiner*—Robert L. Richardson
*Attorney, Agent, or Firm*—Antonelli, Terry, Stout & Kraus

[57] ABSTRACT

An image data transfer system constructed of an image data transfer unit, transmission medium and image data reproduction unit. In the image data transfer unit, an input video signal is transformed into image data through sampling and quantization, the image data are coded in a predetermined image coding method, and transferred to the transmission medium. In the image data reproduction unit, the coded data transferred by the transmission medium are decoded in a predetermined image decoding method, the original video signal is restored from the decoded data. A data transfer speed and transfer scheme are selected such that the total coded data amount for the input video signal over a predetermined time duration becomes equal to or smaller than a transferable data amount determined by a data transfer speed from the transmission medium to the image data reproduction unit and by the predetermined time duration. Data transfer information on the selected data transfer speed or information on the transfer scheme is transferred to the transmission medium along with the coded data.

28 Claims, 13 Drawing Sheets

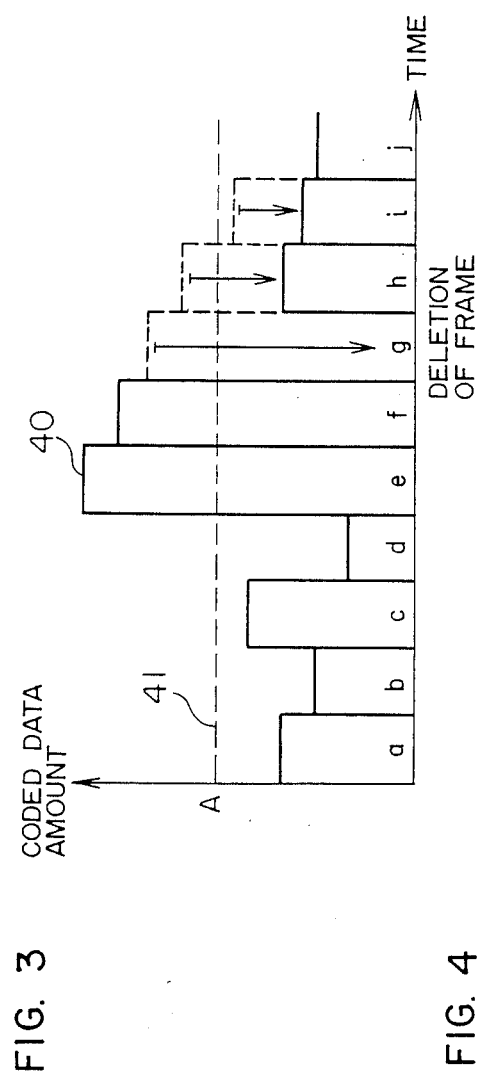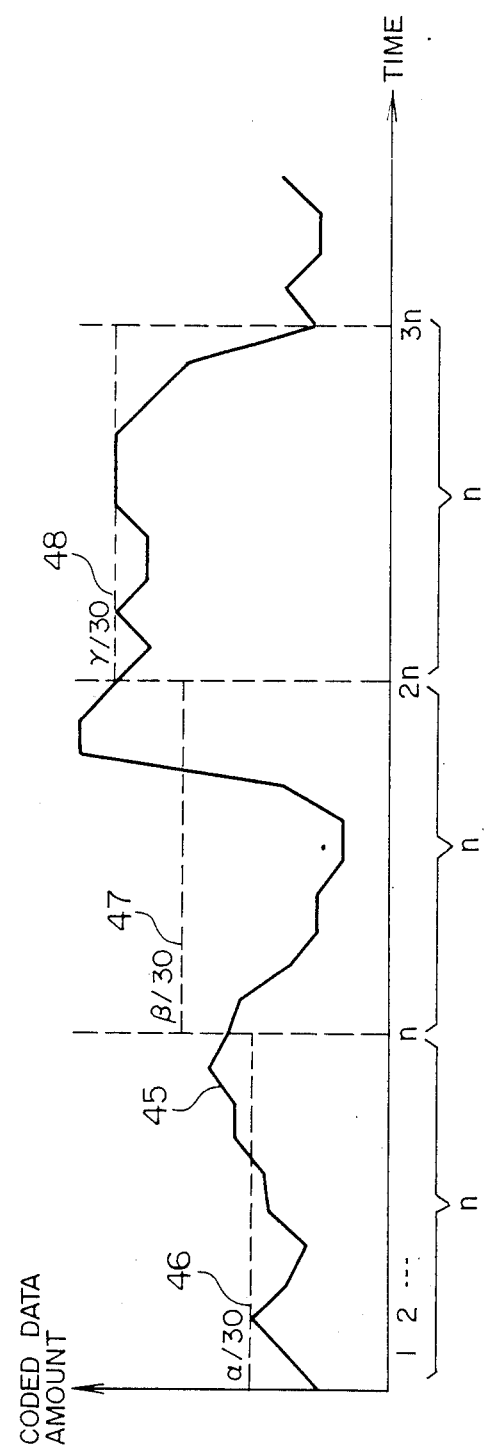
FIG. 3
FIG. 4

FIG. 5
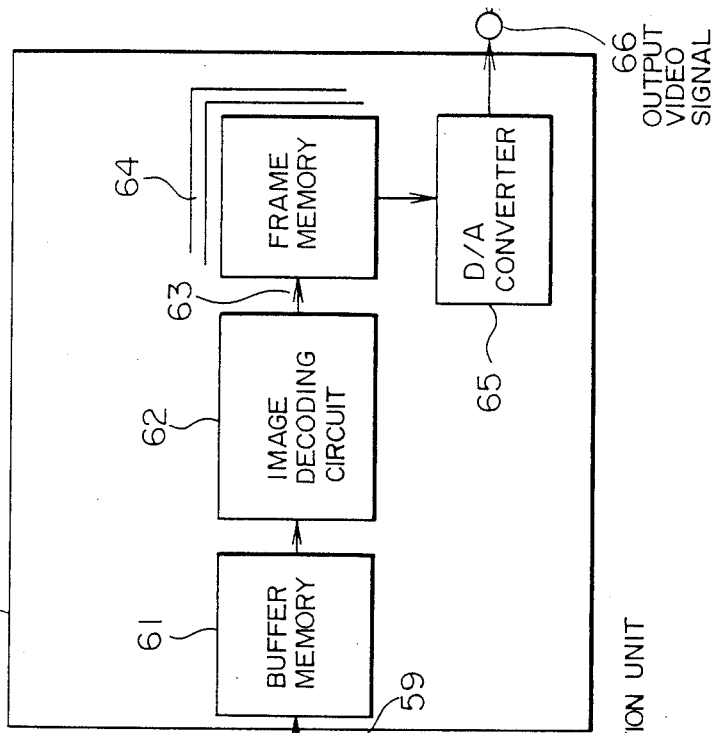
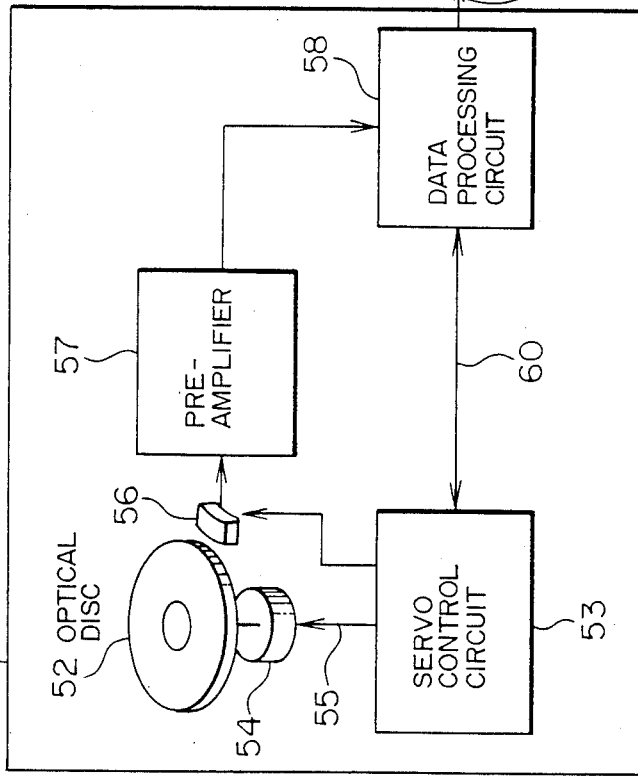

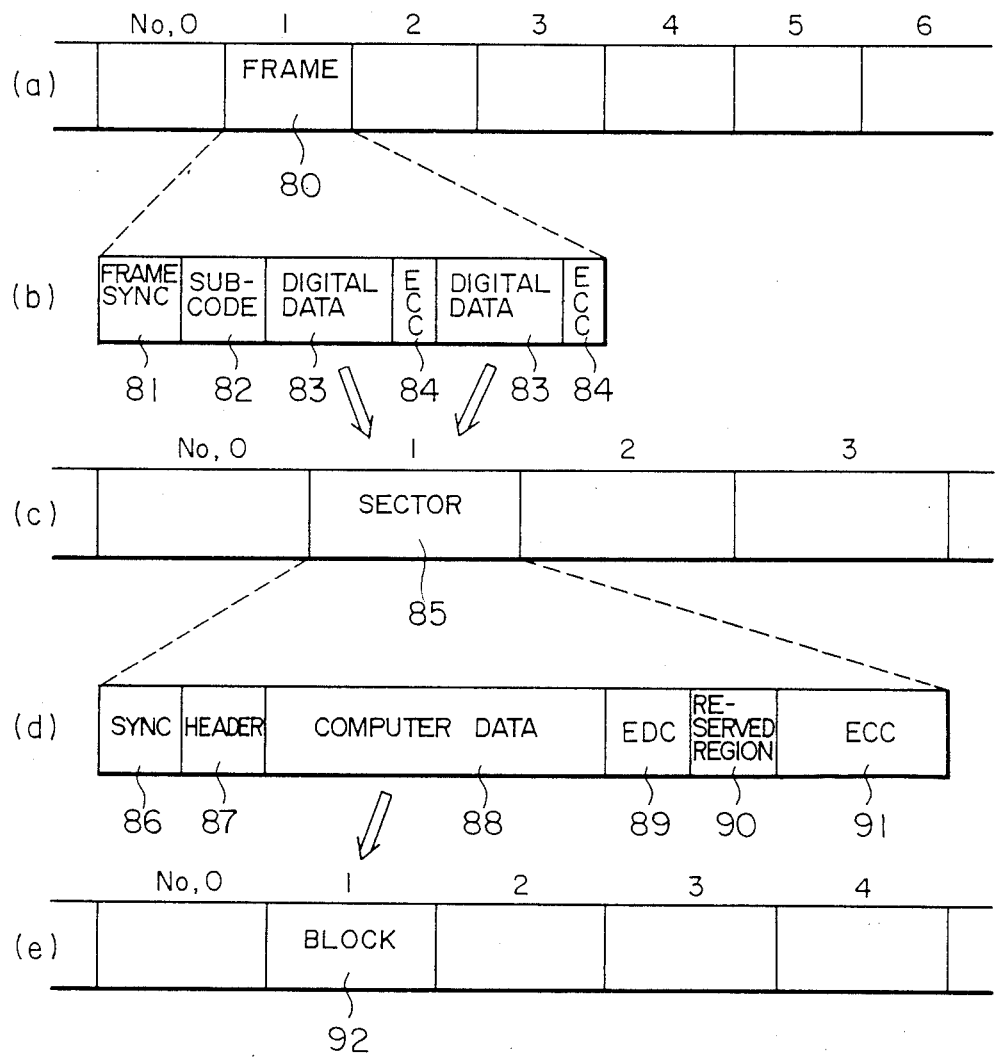

IMAGE DATA TRANSFER METHOD AND APPARATUS THEREFOR

BACKGROUND OF THE INVENTION

The present invention relates to a image data transfer method, i.e., coding, transmitting and decoding method of moving image digital data which method is efficient, cost effective and capable of transferring rapidly moving images clearly without a loss of recording time and image quality.

Conventional transfer methods of moving image data to be used with image coding transmission systems are disclosed in JP-A-No. 62-164391 and IEEE, Trans. on Communications, Vol. COM-32, No. 3, March 1984, pp. 225 to 232.

FIG. 2 is a block diagram showing an image data transfer system according to the above conventional techniques. In the figure, reference numeral 20 designates an image data transfer unit (moving image coding unit), 22 an input video signal, 23 an A/D converter, 24 image data, 25 a frame memory whose capacity allows storage of image data of at least one frame, 26 an image coding circuit, 27 coded data, 28 a buffer memory, 29 a coded data amount control circuit, and 30 a coded data amount control signal. Reference numeral 31 represents a transmission medium, 21 an image data reproduction unit (moving image decoding unit), 32 coded data, 33 a buffer memory, 34 an image decoding circuit, 35 image data, 36 a frame memory, 37 a D/A converter, and 38 an output video signal. FIG. 3 is a graph showing an example of a change with time of the amount of coded data (hereinafter called coded data amount) generated by the image coding circuit 26 shown in FIG. 2. Generally, the coded data amount becomes small as the frame correlation becomes large, and large as the latter becomes small.

In operation of the system shown in FIG. 2, the input video signal 22 is transformed into digital image data 24 by the A/D converter 23, one frame after another every 1/30 second, and is stored in the frame memory 25. The image data 24 stored in the frame memory 25 is subjected to high efficiency coding by the image coding circuit 26 to be stored in the buffer memory 28. The coded data 27 stored in the buffer memory 28 is read out therefrom at a speed of, e.g., 1M bits per second (hereinafter represented by 1 Mbps) and is outputted to the transmission medium 31. If the content of an image in the input video signal 22 changes slowly, the coded data amount 40 generated by the image coding circuit 26 is small, such as in the case of frames a, b, c and d shown in FIG. 3. Namely, the coded data amount, 40 is smaller than the data transfer capacity 41 or level A per one frame determined by the data transmission speed of the transmission medium 31 (in this case, the data transfer capacity per frame is 1 Mbps×1/30 second which is approximately 32K bits). In such a case, the coded data with dummy data inserted therein is sometimes used for synchronous data transmission between the image data transfer unit 20 and the image data reproduction unit 21. On the other hand, if the content of the image in the input video signal 22 changes rapidly, or the scene represented by the input video signal 22 changes, the coded data amount 40 generated by the image coding circuit 26 may exceed the data transfer capacity 41 or level A per one frame, such as in the case of the e and f frames shown in FIG. 3. In such a case, in view of an increase of data amount in the buffer memory 28, a frame such as g frame is deleted by means of the coded data amount control circuit 29, or coding parameters are changed to use a higher data compression rate, such as in the case of the h and i frames. The coded data amount 40 is thus forcibly made small.

A constant data transmission speed has been used for the transmission medium in the prior art techniques, so that frame deletion and/or a coding parameter change has been used for rapidly moving images in order to forcibly reduce the coded data amount. Therefore, the image quality of moving images with rapid change deteriorates extremely, posing a problem associated with information transfer and image reproduction.

In order to solve the above problem, the data transmission speed of the transmission medium can be increased. However, according to the conventional image data transfer method, the data transfer speed is fixed at a constant value, so that, if a communication line is used as the transmission medium, an excessive rise in communication cost occurs. Also, if a package-based medium such as CD-ROM (Compact Disc Read Only Memory) is used as the transmission medium, the total image recording time is considerably reduced. Each of them poses another issue to be solved.

It has been desired therefore to realize an image data transfer method which can solve the above problems and allow rapidly moving images to have the same quality as that of gently moving images, with less reduction of total image recording time, and with cost effectiveness.

SUMMARY OF THE INVENTION

It is an object of the present invention to realize an image data transfer method which, in transferring image data including both gently and rapidly moving images, it is possible to prevent quality deterioration of rapidly moving images, with substantially no reduction of total image recording time, and with high efficiency and cost effectiveness.

According to one aspect of the image data transfer method of the present invention, in transferring image data including both gently and rapidly moving images, different methods of image data transfer are used respectively for gently and rapidly moving images. Specifically, the image data transfer amount to be sent from the image data transfer unit is reduced for gently moving images and increased for rapidly moving images. According to this method, the transfer data amount for rapidly moving images can be made large so that even rapidly moving images do not undergo image quality deterioration. Further, in transferring image data including both gently and rapidly moving images, the total image recording time does not increase substantially since the transfer data amount for gently moving images is made small.

According to the image data transfer method of the present invention, three different types of image transfer methods are used.

According to a first embodiment of the present invention, image data is grouped in units of a predetermined plurality of frames to calculate an average data amount of each group. The data transfer speed is changed in accordance with the average data amount to perform high speed data transfer for rapidly moving images and low speed data transfer for gently moving images.

According to a second embodiment of the present invention, the transfer speed of image data is fixed constant or it is arranged to take a few steps, e.g. two steps of high and low speeds. However, the apparent data transfer speed is changed through a skip, pause or seek operation. Image data for rapidly moving images is transferred continuously at high speed, whereas image data for gently moving images is intermittently transferred through a skip or pause operation to thereby reduce an apparent data transfer speed.

According to a third embodiment of the present invention, in coding image data for a plurality of frames stored in a frame memory including both rapidly and gently moving images, a fraction of the coded data for rapidly moving images is filled in the remaining portion of the data transfer capacity of gently moving images and pretransferred. Therefore, without increasing the total transfer data amount, the transfer amount of image data information for rapidly moving images can be increased.

It is obvious that a combination of the above three different image data transfer methods may also be used.

The present invention realizes an image data transfer method which can transfer rapidly moving images clearly, with substantially no reduction of image, recording time, and with high efficiency and cost effectiveness.

BRIEF DESCRIPTION OF THE DRAWINGS

FIG. 3 is a graph showing an example of a change in coded data amount in a conventional image data transfer method;

FIG. 4 is a graph showing an example of a change in coded data amount in the image data transfer unit of the first embodiment shown in FIG. 1, and the corresponding change of data transfer capacity;

FIG. 5 is a block diagram of an image data reproduction unit (moving image decoding/reproducing unit) used in combination with the image data transfer unit of the first embodiment of the present invention shown in FIG. 1;

FIG. 6 is a schematic diagram showing the structure of a CD-ROM which is one type of optical disk;

FIGS. 7(a)-7(e) are schematic diagrams showing the data format of a CD-ROM;

DESCRIPTION OF THE PREFERRED EMBODIMENTS

The embodiments of the present invention will be described in detail with reference to the accompanying drawings.

1st Embodiment

Figure 1:
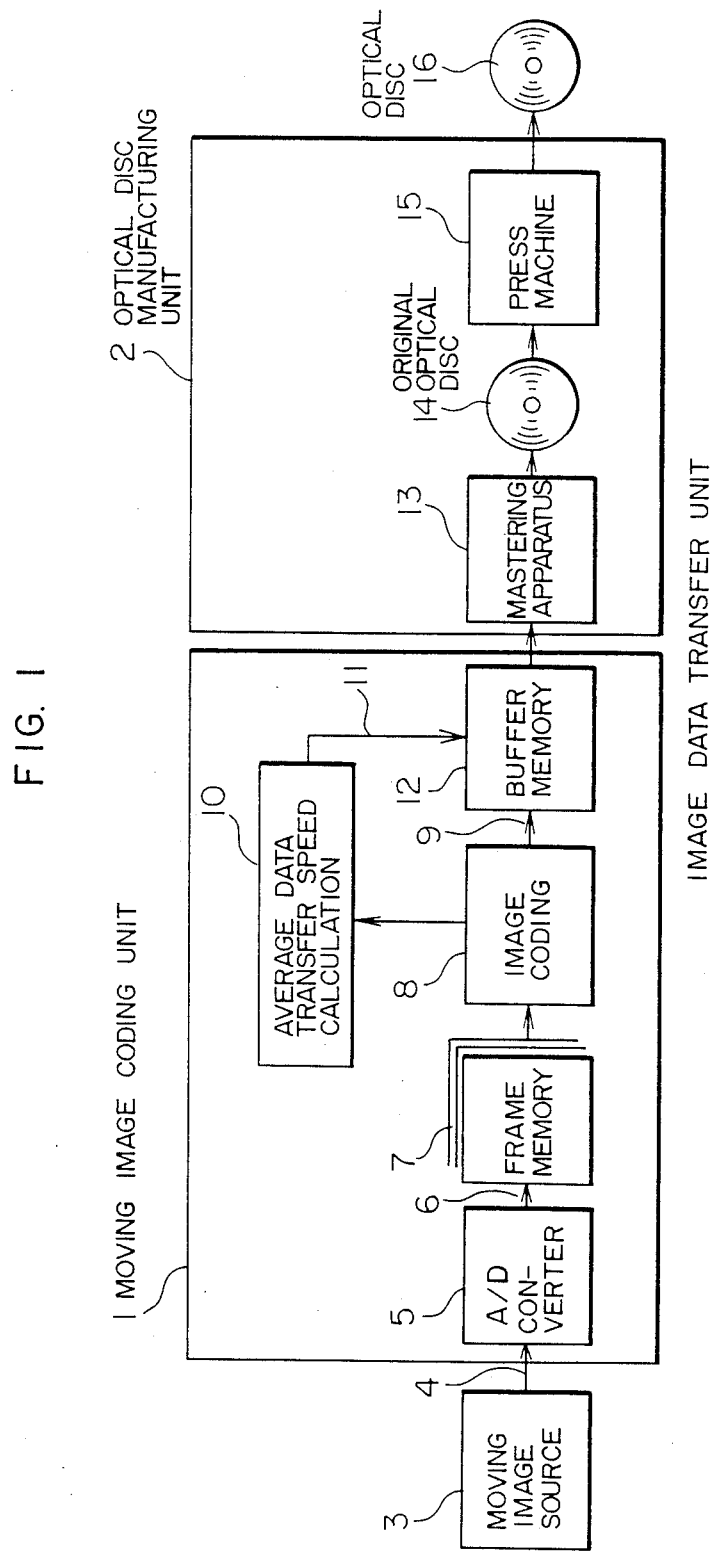
FIG. 1 is a block diagram showing a first embodiment of an image data transfer unit (moving image coding-/recording unit) according to the image data transfer method of the present invention.
Figure 2:
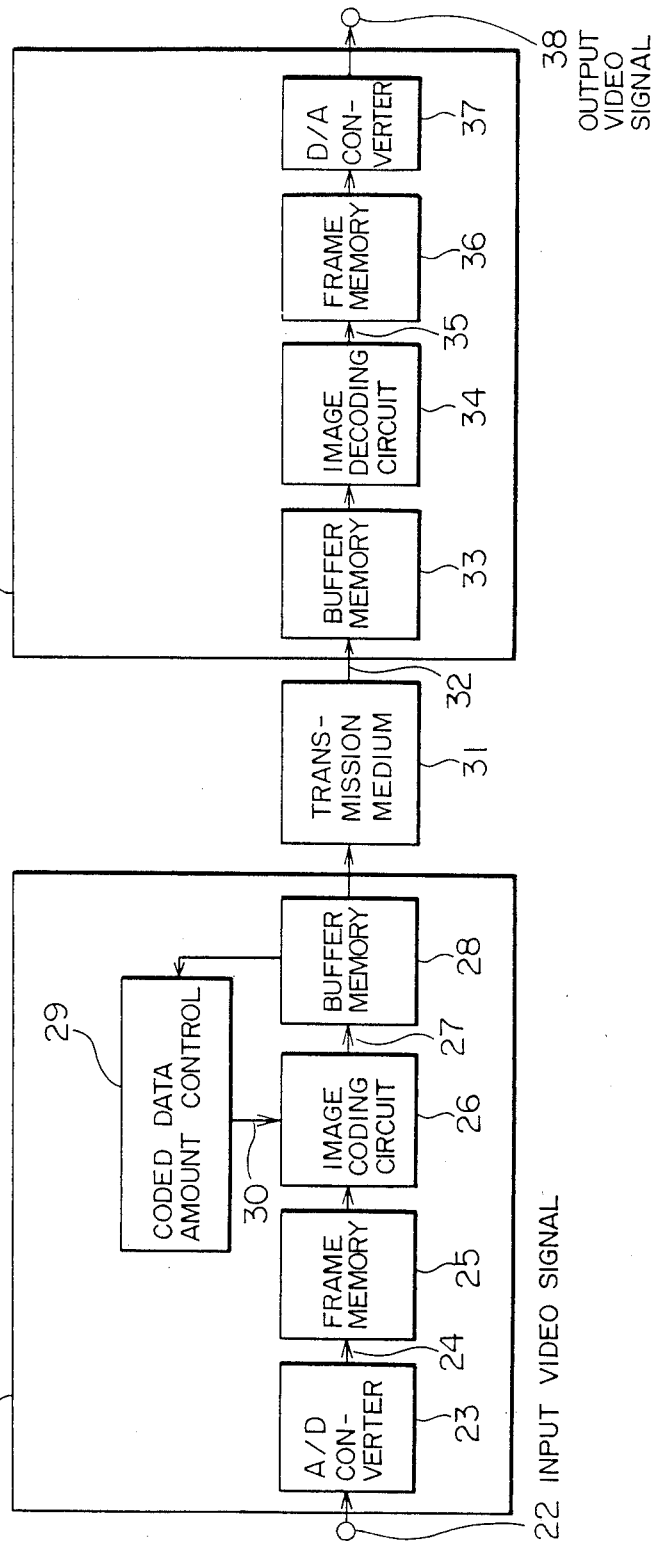
FIG. 2 is a block diagram showing a conventional image data transfer system.

FIG. 1 is a block diagram showing a first embodiment of an image data transfer unit (moving image coding-/recording unit) for coding and recording data in an optical disc according to the image data transfer method of the present invention. In FIG. 1, reference numeral 1 represents a moving image coding unit, and reference numeral 2 represents an optical disc manufacturing unit. Reference numeral 3 represents a moving image source such as a film player, VTR or the like, 4 a moving image signal, 5 an A/D converter, 6 image data, 7 a frame memory whose capacity corresponds to at least n frames, 8 an image coding circuit, 9 coded data, 10 a data transfer speed calculation circuit, 11 data transfer speed information, and 12 a buffer memory. Reference numeral 13 represents a mastering apparatus which reads coded data at a constant speed and forms an original optical disc, 14 an original optical disc, 15 a press machine for manufacturing an optical disc from the original optical disc, and 16 an optical disc.

FIG. 4 is a graph showing an example of a change of coded data amount generated in the image coding circuit 8 shown in FIG. 1, and FIG. 5 is a block diagram of an image data reproduction unit (moving image decoding/reproducing unit) for reproducing data from an optical disc formed by the image data transfer unit shown in FIG. 1. Referring to FIG. 4, reference numeral 45 represents a coded data amount generated by the image coding circuit 8, and reference numerals 46, 47 and 48 data transfer capacities to be changed in n frames unit. Referring to FIG. 5, reference numeral 50 represents an optical disc reproducing unit, 51 a moving image decoding unit, 52 an optical disc on which coded moving images have been recorded, 53 a servo control circuit for control of a motor and an optical pickup device, 54 a motor for rotating an optical disc, 55 a motor rotation control signal, 56 an optical pickup device, 57 a preamplifier for amplifying a signal from the optical pickup device, 58 a data processing circuit for reproducing data, 59 reproduced coded data, 60 data transfer speed information, 61 a buffer memory for storage of reproduced coded moving images, 62 an image decoding circuit for decoding coded images, 63 decoded image data, 64 a frame memory, 65 a D/A converter, and 66 an output video signal.

The operation of the image transfer unit shown in FIG. 1 will be described. In coding and recording images of the moving image source 3 into an optical disc, first moving image signals 4 for n frames are transformed into image data 6 by the A/D converter 5, and stored in the frame memory 7. The image data 6 for n frames in the frame memory 7 are coded by the image coding circuit 8. The data transfer speed calculation circuit 10 calculates an average data amount of the coded data 9 to output it as the data transfer speed information 11. Specifically, the data transfer speed calculation circuit 10 determines V(t) such that it becomes:

$$V(t) \geq \frac{\sum_{i=1}^{n} D(i)}{n \times 1/30} \text{ (bps)}$$

where V(t) is a calculated data transfer speed, and D(i) is a coded data amount for each frame. For example, as shown in FIG. 4, V(t) takes a value:

for $i = 1 \sim n$
$V(t) = \alpha$ (bps)
for $i = (n + 1) \sim 2n$
$V(t) = \beta$ (bps)
for $i = (2n + 1) \sim 3n$
$V(t) = \tau$ (bps)

The data transfer speed information 11 as well as the coded data 9 are stored in the buffer memory 12. The stored data is edited into an optical disc format by the mastering apparatus 13 to be recorded in an original optical disc 14 from which an optical disc 16 is formed by the press machine 15.

The operation of the image data reproduction unit shown in FIG. 5 will then be described. Data stored in the optical disc 52 is read with the optical pickup device 56, amplified and waveform-shaped by the preamplifier 57. The data is then demodulated by the data processing circuit 58 and, is thereafter, subjected to a data error correction process in accordance with a predetermined procedure. The reproduced data is separated into the coded data 59 and data transfer speed information 60. In accordance with the data transfer speed information 60 reproduced by the data processing circuit 58, the servo control circuit 53 outputs the motor rotation control signal 55 for control of the motor 54. In this case, a servo operation is performed so as to make the data transfer speed outputted from the preamplifier 57 constant. Specifically, a constant line velocity (CLV) rotation control is performed so as to obtain the data transfer speed determined by the data transfer speed information 60. For example, as described previously, the data transfer speed takes one of three speeds $\alpha$, $\beta$ and $\gamma$ (bps). The coded data 59 of the moving image reproduced by the data processing circuit 58 is stored in the buffer memory 61 and decoded into the image data 63 by the image decoding circuit 62 to be written in the frame memory 64. The image data 63 is sequentially read from the frame memory in accordance with the designated scan scheme, and is transformed into the output video signal 66 by the D/A converter 65 and outputted therefrom. Assuming that the maximum data transfer speed is $\gamma$ (bps), then the capacity of the buffer memory 61 becomes sufficient if only it takes a value of $\gamma \times n \times 1/30$ (bit). However, in practice, it is necessary to have some additional memory capacity in consideration of a delay of the optical disc 52 in responding to a change of the data transfer speed. Although the embodiment processes image data in n frames as a unit, the value of n may be changed in inverse proportion with the data transfer speed to reduce the capacity of the buffer memory 61.

In the above embodiment, the data transfer speed has been changed by controlling the rotation speed of an optical disc. An optical disc reproducing unit having a fixed data transfer speed can be used. For example, using a commonly employed CD-ROM reproducing unit, it is possible to make the data transfer speed equivalently variable through a devised data transfer scheme. An example of such method will be described in detail below.

A CD-ROM records in an optical disc similar to that of an audio CD, not digital audio data but computer data. The structure of an optical disc is shown in FIG. 6. An optical disc is made of a circular disc having a diameter of 12 cm and thickness 1.2 mm with one spiral track 70 of about 5 km formed thereon. On the track 70 there are recorded pits of width 0.4 micron and length 0.9 to 3.3 micron (which length varies with recorded data). A lead-in area 71 starts at the diameter 46 mm, a program area 72 follows from diameter 50 mm to 116 mm, and a lead-out area 73 up to diameter 120 mm. Digital audio data and computer data are recorded in the program area 72. A TOC (Table Of Contents) indicating the directory of the whole disc is recorded at the lead-in area.

The format of data recorded in a CD-ROM disc is shown in FIG. 7. The minimum data record unit is a frame 80 similar to the case of an audio CD, as shown in FIG. 7(a). As shown in FIG. 7(b), the frame 80 made of 588 bits in total includes frame sync data 81, sub-code 82 (attribute information freely usable), digital data 83 of 24 bytes, and an error correction code ECC 84 according to double coded Reed Solomon Code. Frames 80 of about 26 millions are assigned on the track 70 of the disc. Data is not sequentially recorded in the disc but is properly interleaved over a fairly long region and recorded therein in order to improve the error correction ability for burst errors to be caused by defects or stains on the disc. In the case of an audio CD, 16 bit, 2 channel digital audio data totaling in amount 24 bytes and sampled from an audio signal at 44.1 KHz is recorded in one frame 80. In the case of a CD-ROM, instead of such audio data, computer data is recorded.

One sector 85 of the CD-ROM is constructed of, as shown in FIG. 7(c), 2352 bytes of 98 frame digital data 83. The 2048 byte computer data are recorded and blocked therein. One sector 85 includes 12 byte sync data 86 for synchronization purposes, 4 byte header data 87 for address/mode information, 2048 byte computer data 83, a 32 bit CRC, a 4 byte error detection code EDC 89, an 8 byte reserved region 90 for future expansion, and a 276 byte error correction code ECC 91 according to a double coded Reed Solomon Code. A computer recognizes if computer data 88 of 2 kB are recorded sequentially one after another as shown in FIG. 7(e).

An enhanced error correction is applied to audio CDs as previously described. In the case of CD-ROMs which are directed to use by computers, data integrity is improved through a further enhanced error correction. The data transfer speed of a CD-ROM is 1.2 Mbps, i.e., 150 kB/sec, allowing computer data of about 40 MB to be recorded.

2nd Embodiment

Figure 8:
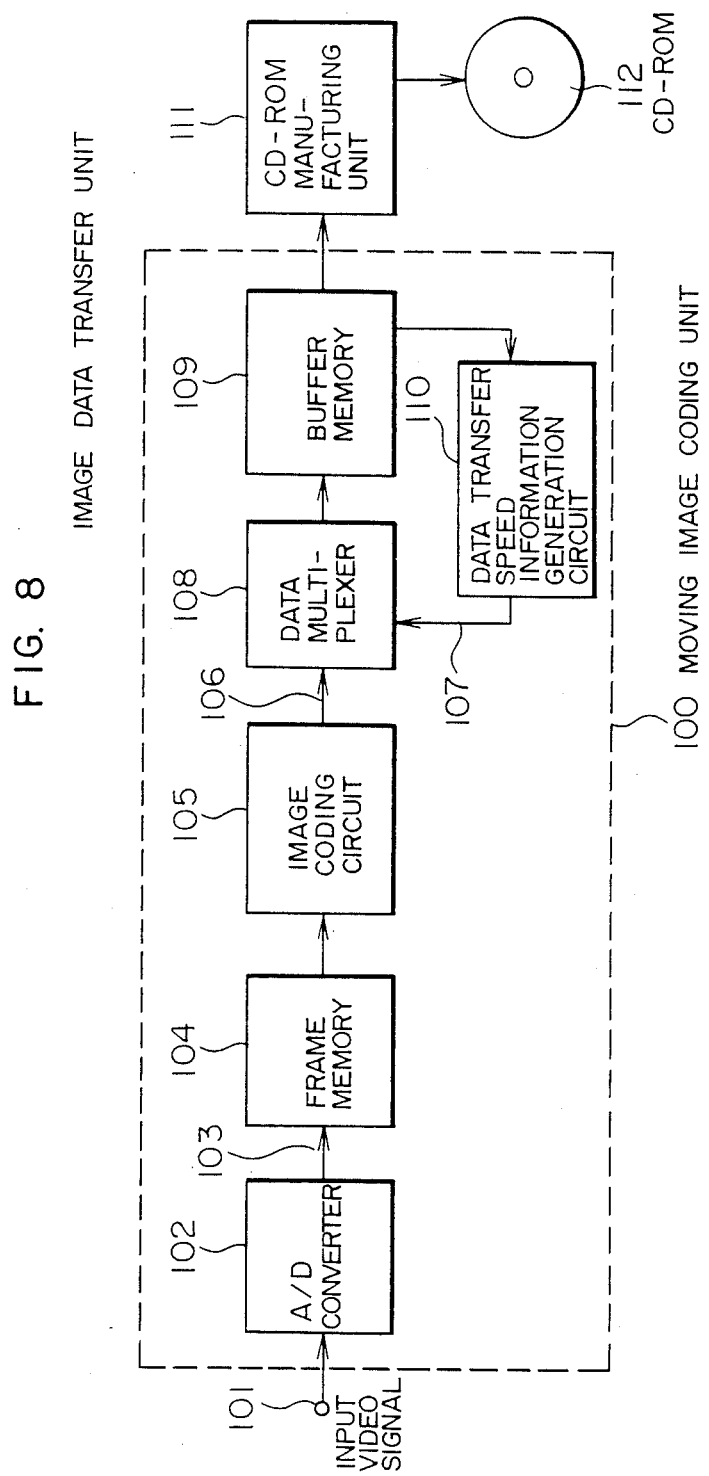
FIG. 8 is a block diagram showing a second embodiment of the image data transfer unit (moving image coding/recording unit) according to the image data transfer method of the present invention.
Figure 9:
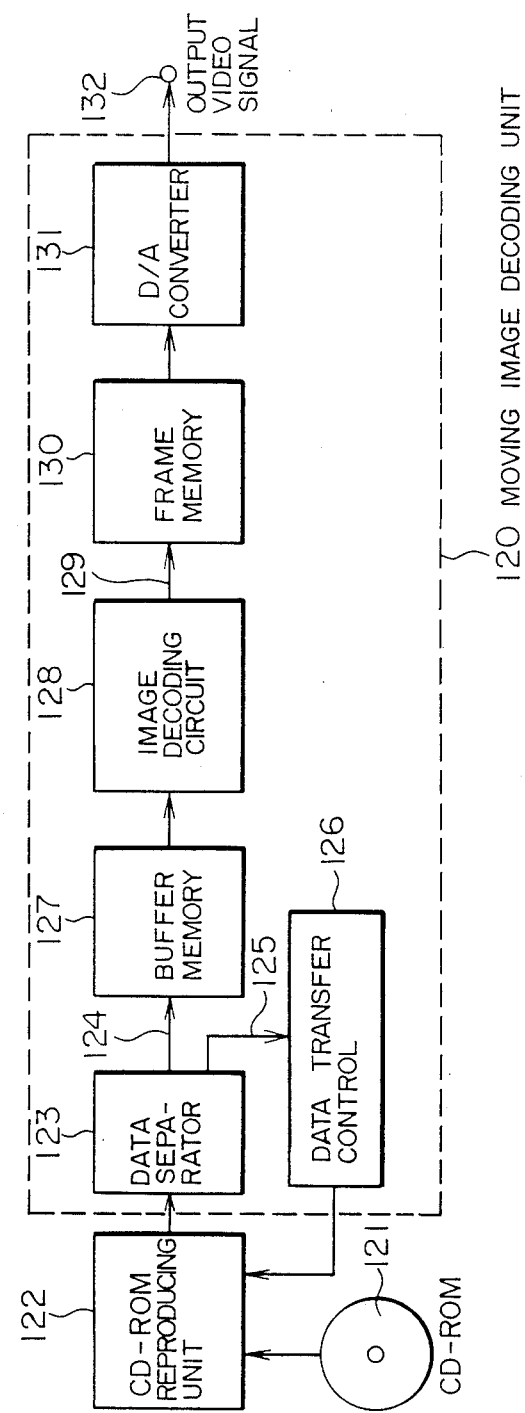
FIG. 9 is a block diagram of an image data reproduction unit (moving image decoding/reproducing unit) used in combination with the image data transfer unit of the second embodiment of the present invention shown in FIG. 8.

FIG. 8 is a block diagram showing an image data transfer unit (moving image coding/recording unit) for recording moving images into a CD-ROM, and FIG. 9 is a block diagram showing an image data reproduction unit (moving image decoding/reproducing unit) for reproducing moving images from a CD-ROM. Referring first to FIG. 8, reference numeral 100 represents a moving image coding unit, 111 a CD-ROM manufacturing unit, and 112 a CD-ROM. In the moving image coding unit 100, reference numeral 101 represents an input video signal, 102 an A/D converter, 103 image data, 104 a frame memory having a one or more frame capacity, 105 an image coding circuit, 106 coded data, 107 data transfer speed information, 108 a data multiplexer, 109 a buffer memory, and 110 a data transfer speed information generation circuit. Referring next to FIG. 9, reference numeral 120 represents a moving image decoding unit, 121 a CD-ROM, and 122 a CD-ROM reproducing unit. In the moving image decoding unit 120, reference numeral 123 represents a data separator, 124 coded data, 125 data transfer speed information, 126 a data transfer control circuit, 127 a buffer memory, 128 an image decoding circuit, 129 image data, 130 a frame memory having a one or more frame capacity, 131 a D/A converter, and 132 an output video signal.

The operation of the image data transfer unit shown in FIG. 8 will be first described. A video signal outputted from a television, video recorder or the like is separated from the NTSC composite video signal into three components video signals (e.g., luminance signal Y, color difference signals R-Y and B-Y). The input video signals 101 are sampled at a predetermined sampling frequency (e.g., frequency four times as high as the color subcarrier frequency 3.58 MHz) by the A/D converter 102 and sequentially converted into the digital image data 103. Since the number of bits processed at the A/D converter 102 is usually 8 bits, the data amount of image data 103 per pixel is 8 bits for each component, totaling 24 bits. The frame memory 104 has a capacity capable of storing image data of plural frames so that the digital image data 103 is sequentially stored therein up to a predetermined number of frames. Although the number of necessary frames depends on the type of coding method, if an inter-frame coding is employed for example, image data of two frames at a minimum becomes necessary. The image data 103 stored in the frame memory 104 is subjected to high efficiency coding by the image coding circuit 105 to generate the coded data 106 with less redundancy. Although there are known various image coding methods, if for example a motion compensated inter-frame coding method is employed, it is possible to compress image data about 1/100 in average. Namely, the image data 103 having 24 bits per pixel can be compressed to coded data having about 0.2 bit per pixel. However, depending upon the ratio of moving image regions, the degree of rapid motion, fineness and clearness of the image pattern, and the like, the data compression ratio varies considerably, so that the data amount of the coded data 106 changes with each frame.

Conventionally, a devised method has been generally adopted in controlling the amount of the coded data 106 generated by the image coding circuit 105, whereby the coding parameters are changed in accordance with the amount of coded data 106 stored in the buffer memory 109. The devised method aims at maintaining the amount of the coded data in the buffer memory 109 as constant as possible, and making the average value of data amount generated during a unit time coincide with the data transfer speed of a CD-ROM. Conventionally, since coding and decoding units which employ a communication line with a constant data transfer speed have been developed, such a devised method of controlling the coded data amount by changing the coding parameters has been generally adopted. However, with this method, the data amount is controlled by changing the coding parameters at any time when necessary, independently from the information amount or content of an inputted image, so that the coding error varies greatly with each frame, resulting in considerable deterioration of an image quality. In view of this, according to the present embodiment, a method is employed wherein the data transfer speed information generating circuit 110 is provided for generating the data transfer speed information 107 in accordance with the amount of the coded data 106 stored in the buffer memory 109, to accordingly control the data transfer speed from the buffer memory 109 to the CD-ROM manufacturing unit 111. With this method, it becomes possible to improve the image quality while suppressing the variation of coding error, and record moving images for a long period. The method will be later described more particularly.

The coded data 106 outputted from the image coding circuit 105 is multiplexed with the data transfer speed information 107 by the data multiplexer circuit 108, and is stored in the buffer memory 109. The stored data is sequentially read out from the buffer memory 109 and is outputted to the CD-ROM manufacturing unit 111 while controlling the data transfer speed. A CD-ROM is not such a medium in which users can record data easily that the CD-ROM manufacturing unit 111 is used to form an original disc and press it into a CD-ROM 112.

Next, the operation of the image data reproducing unit shown in FIG. 9 will be described. Image data in the CD-ROM disc 121 is reproduced and read by the CD-ROM reproducing unit 122. The read-out data is separated into the coded data 124 and data transfer speed information 125 by the data separator 123. In accordance with the data transfer speed information 125, the data transfer control circuit 126 controls the data transfer speed to the CD-ROM reproducing unit 122. This control scheme will be described later in detail. The coded data 124 is temporarily stored in the buffer memory 127. The amount of the coded data 124 to be stored in the buffer memory 127 is maintained substantially uniform because the data transfer speed control is being performed. The coded data 124 read out from the buffer memory 127 is transformed into the image data 129 by the image decoding circuit 128. The decoded image data 129 is stored in the frame memory 130 and transformed into the analog video signal 132 by the A/D converter 131 to be displayed on a CRT or the like.

The description will now be directed to the scheme for control of data transfer speed from the moving image coding unit 100 to the CD-ROM, manufacturing unit 111 shown in FIG. 8, and to the scheme for control of data transfer speed from the CD-ROM reproducing unit 122 to the moving image decoding unit 120 shown in FIG. 9. The scheme for control of data transfer speed will now be described in detail wherein the data transfer speed takes two steps including a maximum data transfer speed and a lower data transfer speed, the former being set at the CD-ROM data transfer speed of 1.2 Mbps (i.e., 150 kB/sec).

Figure 10:
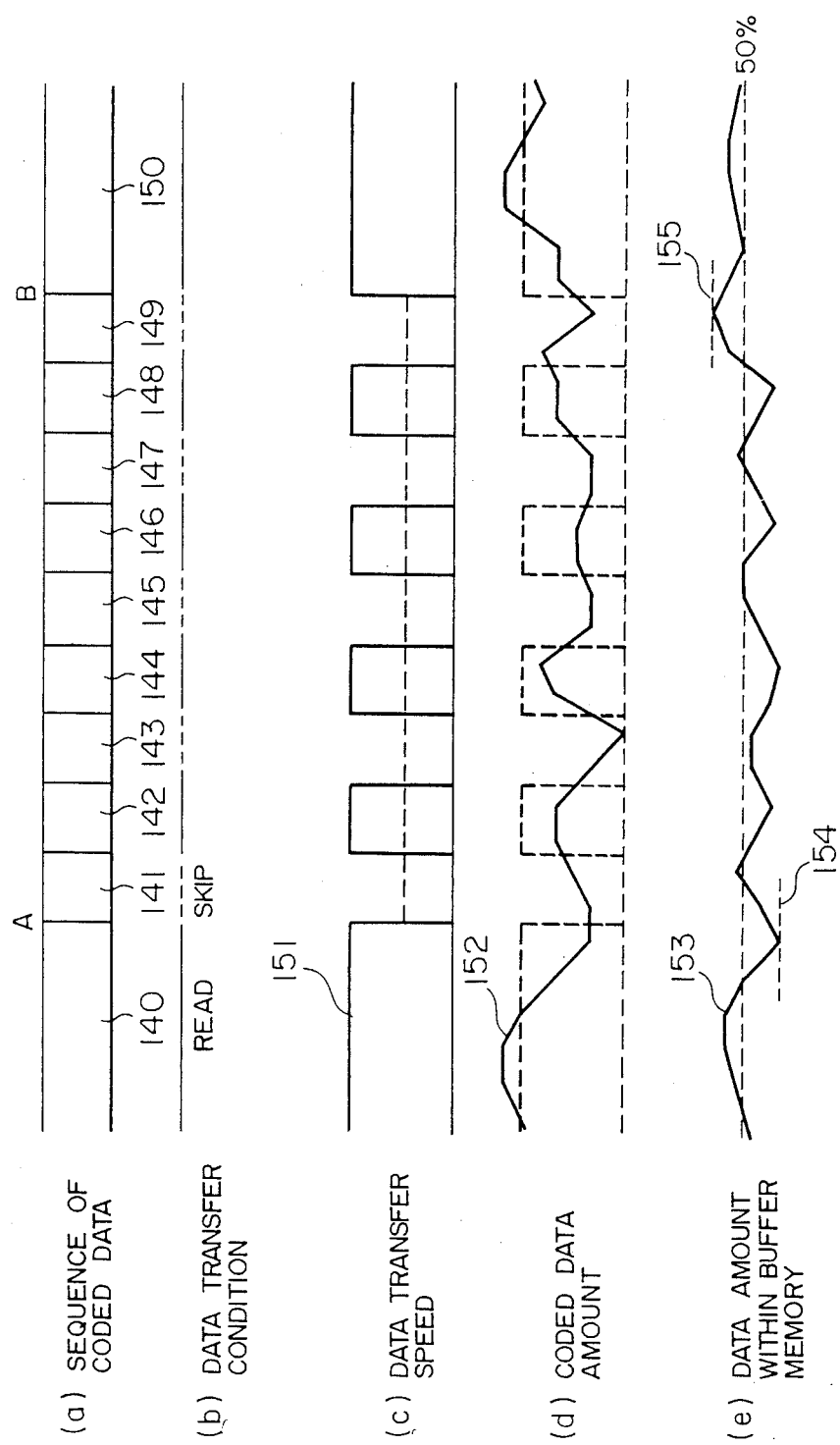
FIGS. 10(a)-10(e) illustrate an embodiment of a data transfer speed control scheme used with the unit shown in FIG. 8 according to the image data transfer method of the present invention.

FIG. 10 illustrates a first example of the data transfer speed control scheme as mentioned with respect to the second embodiment. FIG. 10(a) shows a sequence of coded data 106 recorded sequentially on the track of a CD-ROM, FIG. 10(b) shows how data is transferred from the moving image coding unit 100 to the CD-ROM manufacturing unit 111, FIG. 10(c) shows the data transfer speed, FIG. 10(d) shows the amount of the coded data 106 generated by the image coding circuit 105, and FIG. 10(e) shows the amount of the coded data 106 stored in the buffer memory 109.

The coded data amount 152 of the moving image subjected to high efficiency coding varies greatly as shown in FIG. 10(d). Therefore, it is necessary to control the data amount 153 within the buffer memory by changing the data transfer speed. Specifically, while data transfer of coded data at sector 140 is performed at the maximum data transfer speed, the data amount 153 within the buffer memory falls to the lower limit threshold 154 at time A shown in FIG. 10(e). Then, coded data at sectors 141 to 149 are transferred by changing to the lower data transfer speed at time A. During this data transfer, the data amount 153 within the buffer memory goes to the upper limit threshold 155 at time B. Therefore, coded data at sector 150 is transferred at the maximum data transfer speed again. In order to allow data transfer at the lower data transfer speed, sectors 141, 143, 145, 147 and 149 are skipped whereas sectors 142, 144, 146 and 148 are read, as shown in FIGS. 10(a) and 10(b) during the period from time A to time B. Accordingly, the lower data transfer speed (indicated by a broken line in FIG. 10(c), which is half the maximum data transfer speed, can be realized equivalently.

During skipping of sectors, data transfer is not performed, or alternatively data transfer is performed with the transferred data neglected. Data other than coded data may be stored in sectors to be skipped so that the memory capacity can be effectively utilized.

Figure 11:
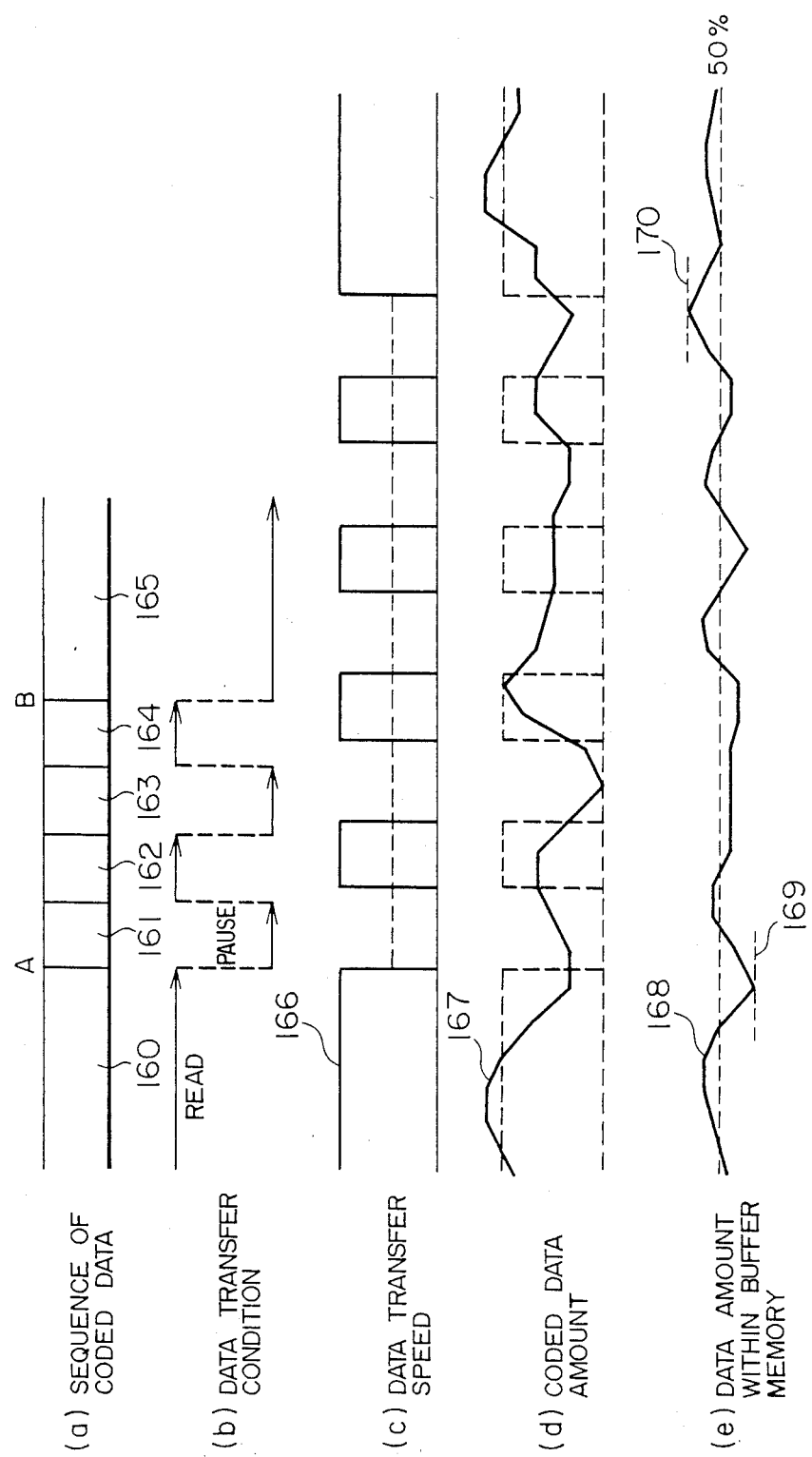
FIGS. 11(a)-11(e) illustrate an embodiment of another data transfer speed control scheme used with the unit shown in FIG. 8 according to the image data transfer method of the present invention.

FIG. 11 illustrates a second example of the data transfer speed control scheme as mentioned with respect to the second embodiment. FIG. 11(a) shows a sequence of coded data, FIG. 11(b) shows how the coded data is transferred, FIG. 11(c) shows the coded data amount, and FIG. 11(e) shows the data amount within the buffer memory.

The data amount 168 within the buffer memory is controlled by changing the data transfer amount in accordance with a change of the coded data amount 167. Specifically, during the period from time A when the data amount 168 within the buffer memory falls to the lower limit threshold 169 to time B when it reaches the upper limit threshold 170, data transfer of coded data at sectors 161 to 164 is performed at the lower data transfer speed. In order to allow data transfer at the lower data transfer speed, data transfer at sectors 161, 162, 163 and 164 pauses for a proper duration at the start and end thereof, as shown in FIGS. 11(a) and 11(b) during the period from time A to time B. Accordingly, the lower data transfer speed (indicated by a broken line in FIG. 11(c), which is slower than the maximum data transfer speed can be realized equivalently.

Instead of two steps of data transfer speeds, a larger number of steps may be readily used by adjusting the pause duration. Instead of using a pause for each sector, a pause may be used every plural sectors.

Figure 12:
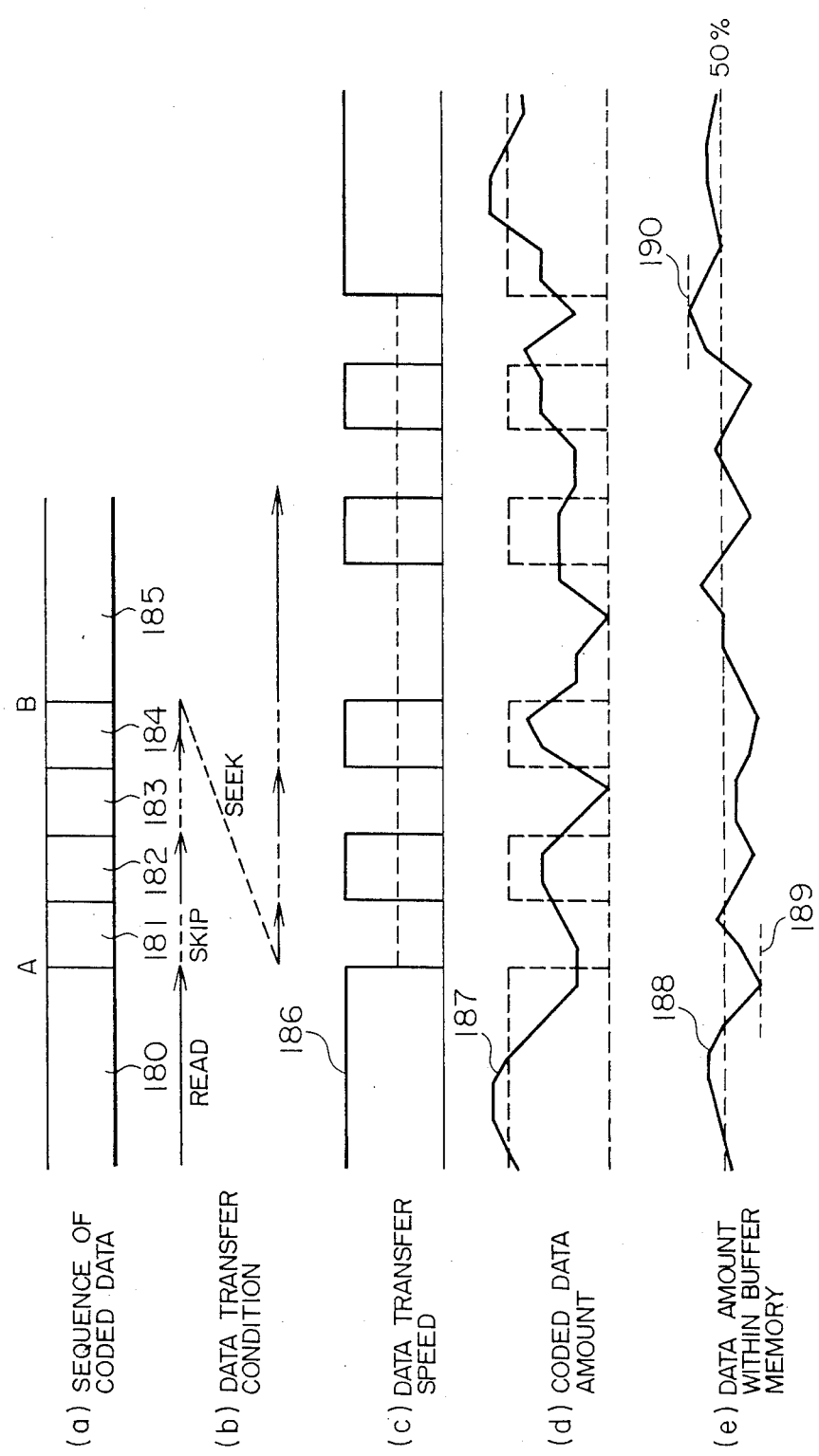
FIGS. 12(a)-12(e) illustrate an embodiment of a further data transfer speed control scheme used with the unit shown in FIG. 8 according to the image data transfer method of the present invention.

FIG. 12 illustrates a third example of the data transfer speed control scheme as mentioned with respect to the second embodiment. FIG. 12(a) shows a sequence of coded data, FIG. 12(b) shows how the coded data is transferred, FIG. 12(c) shows the data transfer speed, FIG. 12(d) shows the coded data amount, and FIG. 12(e) shows the data amount within the buffer memory.

The data transfer speed is changed in accordance with a change of the coded data amount 187 shown in FIG. 12(d) to accordingly control the data amount 188 within the buffer memory shown in FIG. 12(e). Specifically, during the period from time A when the data amount 188 within the buffer memory lowers to a lower limit threshold 189 to time B when it goes higher than an upper limit threshold 190, data transfer of coded data at sectors 181 to 184 is performed at the lower data transfer speed. In order to allow data transfer at the lower data transfer speed, as shown in FIGS. 12(a) and 12(b) during the period from time A to time B, data transfer at sectors 181 and 183 is skipped and data transfer only at sectors at 182 and 184 is performed. Next, a seek operation is performed to time A again to read and transfer image data at sectors previously skipped. Accordingly, the lower data transfer, speed (indicated by a broken line in FIG. 12(c), which is slower than the maximum data transfer speed, can be realized equivalently.

Instead of using a ratio 1 of the number of skipped sectors to the number of sectors for data transfer, a ratio N may be used by repeating a seek N times to return from the end sector to the start sector.

Three examples of the data transfer speed control scheme have been described in detail with reference to FIGS. 10 to 12. In the foregoing description, the control of the coded data transfer speed has been conducted in accordance with the data amount in the buffer memory of the moving image coding unit 100. However, such control may be conducted through other methods. For example, the data amount within the buffer memory of the moving image decoding unit 120 is estimated to perform such control in accordance with the comparison result between the estimated data amount and a predetermined threshold value. Further, such control may be performed in accordance with the coded data amount in the image coding circuit 105, rather than the amount of data in the buffer memory. For example, the frame memory 104 of the moving image coding unit 100 is arranged to have a capacity of n frames. Image data of n frames are coded and the total coded data amount is calculated to control the data transfer speed.

It is necessary to store the data transfer speed information 107 along with the coded data in the CD-ROM 112. The data transfer speed information may be recorded within the sequence of coded data, or may be recorded collectively in a specified region of the CD-ROM, such as the sub-code region shown in FIG. 7(b) or the reserved region shown in FIG. 7(d).

3rd Embodiment

The third embodiment of the image data transfer method of the present invention will be described.

Figure 13:
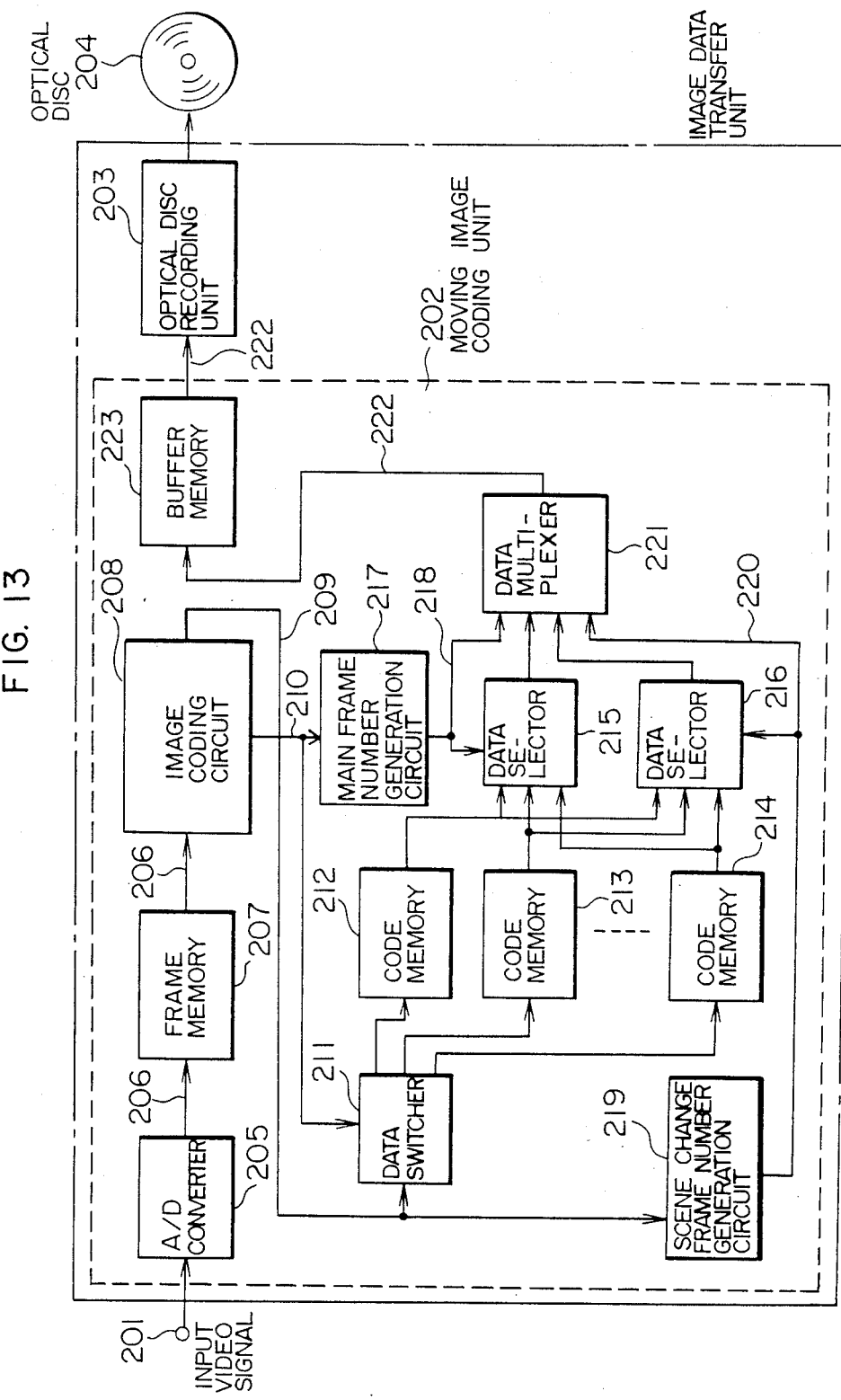
FIG. 13 is a block diagram showing a third embodiment of an image data transfer unit (moving image coding/recording unit) according to the image data transfer method of the present invention.
Figure 14:
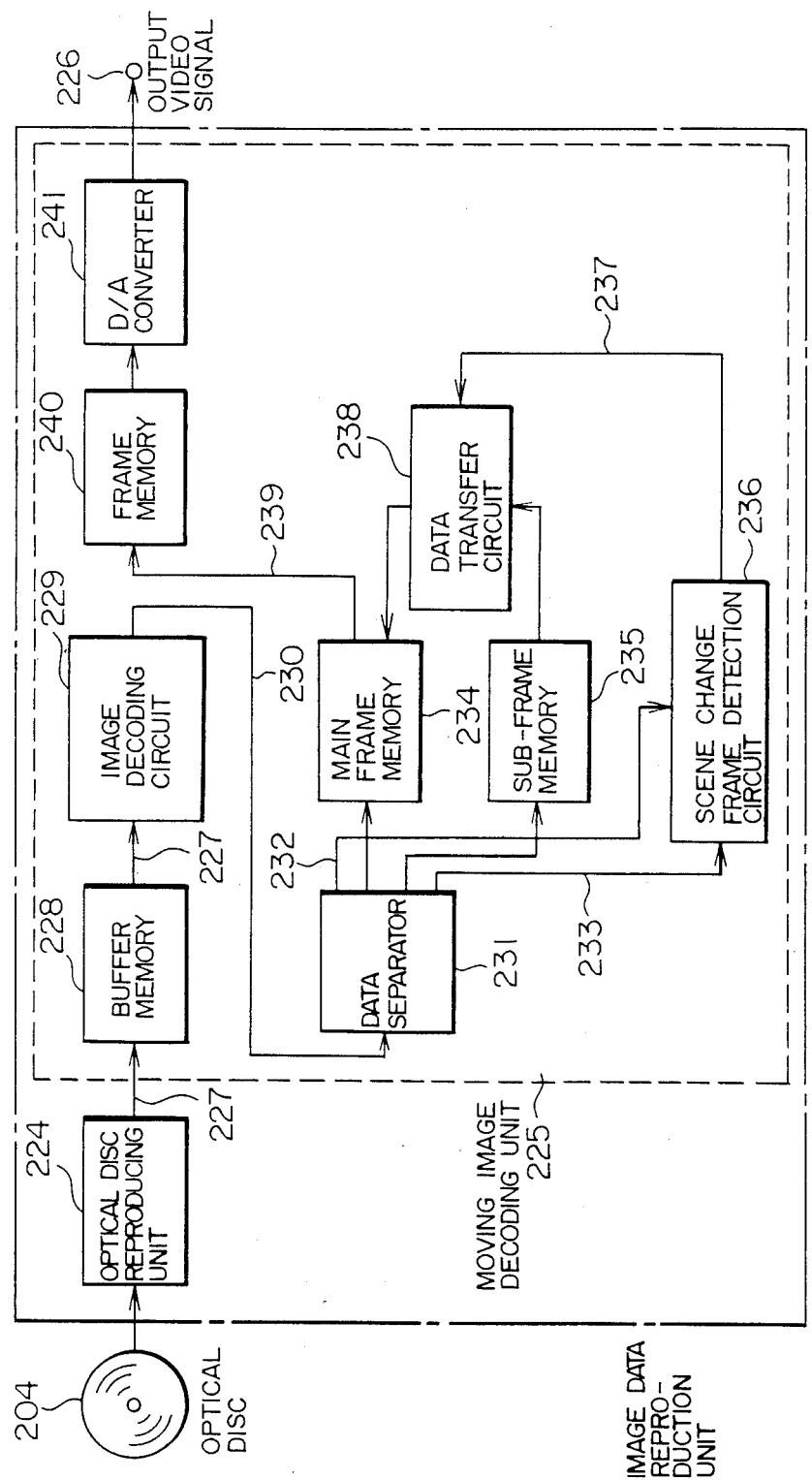
FIG. 14 is a block diagram of an image data reproduction unit (moving image decoding/reproducing unit) used in combination with the image data unit of the third embodiment of the present invention shown in FIG. 13.

FIG. 13 is a block diagram showing an image data transfer unit (moving image coding/recording unit). FIG. 14 is a block diagram showing an image data reproduction unit (moving image decoding/reproducing unit) for use with the image data transfer unit.

Referring to FIG. 13, reference numeral 201 represents an input video signal, 202 a moving image coding unit, 203 an optical disc recording unit, and 204 an optical disc. The image data transfer unit is constructed of the moving image coding unit 202 and the optical disc recording unit 203. In the moving image coding unit 202, reference numeral 205 represents an A/D converter, 206 image data, 207 a frame memory, 208 an image coding circuit, 209 coded data for a current frame, 210 a current frame number, 211 a data switcher, 212 to 214 N (N is a natural number 2 or larger) code memories, 215 and 216 a data selector, 217 a main frame number generation circuit, 218 a main frame number, 219 a scene change frame number generation circuit, 220 a scene change frame number, 221 a data multiplexer, 222 coded data to be transferred, and 223 a buffer memory.

Referring to FIG. 14, reference numeral 204 represents an optical disc, 224 an optical disc reproducing unit, 225 a moving image decoding unit, and 226 an output video signal. The image data reproduction unit is constructed of the optical disc reproducing unit 224 and the moving image decoding unit 225. In the moving image decoding unit 225, reference numeral 227 represents coded data read out from the optical disc 204, 228 a buffer memory, 229 an image decoding circuit, 230 decoded image data, 231 a data separator, 232 a main frame number, 233 a scene change frame number, 234 a main frame memory, 235 a sub-frame memory, 236 a scene change frame detection circuit, 237 a data transfer instruction signal, 238 a data transfer circuit, 239 image data for a current frame, 240 a frame memory, and 241 a D/A converter.

The operation of the image data transfer unit shown in FIG. 13 will be described first. A video signal 201 inputted to the moving image coding unit 202 is converted into image data 206 by the A/D converter 205, and stored in the frame memory 207. At the image coding circuit 208, the image data 206 is subjected to high efficiency coding and is compressed to generate coded data for a current frame 209. The image coding circuit 208 performs coding of only those blocks whose content have changed to some degree relative to the preceding frame, i.e., only those significant blocks, to thereby obtain a high data compression ratio. The coded data for a current frame 209 is written through the data switcher 211 into the n-th code memory which is determined in accordance with the current frame number 210. The number n is a remainder of division of the current frame number 210 by N. Thus, the N code memories 212 to 214 are cyclically used in writing the coded data of a current frame 209.

The main frame number generation circuit 217 generates the main frame number 218 through subtraction of (N−1) from the current frame number 210. The main frame number accordingly represents the oldest frame number among a plurality of frames whose data is stored in the N code memories 212 to 214. The content of the m-th code memory is read via the data selector 215 as the main frame coded data. The number m is a remainder of division of the main frame number 218 by N.

The scene change frame number generation circuit 219 always checks the amount of the coded data 209 for a current frame, the coded data having been generated by the image coding circuit 208 and being written into the code memories 212 to 214. The scene change frame number generation circuit 219 judges a current frame as a scene change frame if it has the data amount equal to and larger than a predetermined threshold value, and outputs the scene change frame number 220 for a period of N frames. A fraction of the content of the k-th code memory determined by the scene change frame number 220 is sequentially read via the data selector 216 as the coded data for the scene change frame. The number k is a remainder of division of the scene change frame number 220 by N. Reading a fraction of the scene change frame coded data is performed in parallel with reading the main frame coded data from the m-th code memory.

The main frame number 218 and associated coded data, and the scene change frame number 220 and associated coded data are multiplexed together by the data multiplexer 221 and sent out as the coded data 222. The transferred coded data 222 is temporarily stored in the buffer memory 223 and thereafter, supplied to the optical disc recording unit 203 to be written in the optical disc 204 sequentially in accordance with the predetermined optical disc recording method and data format.

The operation of the image data reproduction unit shown in FIG. 14 will then be described. The coded data 227 read out from the optical disc 204 by the optical disc reproduction unit 224 are supplied to the moving image decoding unit 225 in the same order as that when the data was recorded. The coded data 227 read out from the optical disc 204 is temporarily stored in the buffer memory 228 and, thereafter, is decoded and expanded by the image decoding circuit 229 to thus obtain the decoded image data 230. The decoded image data 230 is separated by the data separator 231 into main frame image data, a fraction of pretransferred image data for the scene change frame, a main frame number 232, and a scene change frame number 233. The main frame image data is written in the main frame memory 234, whereas a fraction of pre-transferred image data for the scene change frame is written in the sub-frame memory 235.

The scene change frame detection circuit 236 holds the scene change frame number 233 and compares it with the main frame numbers 232 sequentially sent from the data separator 231. It is detected, when both the numbers become coincident, that the scene change frame has come. Then, the scene change frame detection circuit 236 outputs the data transfer instruction signal 237 to the data transfer circuit 238.

In response to the data transfer instruction signal 237, the data transfer circuit 238 causes the scene change frame image data having been stored in the sub-frame memory 235 to be transferred to the main frame memory 234. At this time, the remaining image data of the scene change frame which has been transferred as the main frame image data is also written in the main memory 234. The main frame memory 234 is thus arranged to hold the image data 239 necessary for a current frame. The current frame image data 239 is temporarily stored in the frame memory 240 and, thereafter, is converted into the output video signal 226 by the D/A converter 241 and outputted therefrom.

Figure 15:
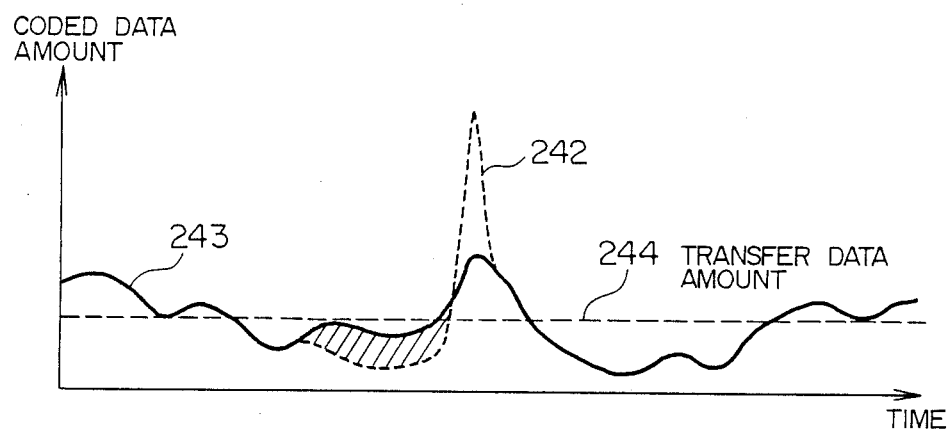
FIG. 15 is a schematic diagram showing an example of a change in coded data amount in the moving image coding unit of the third embodiment of the present invention.

FIG. 15 is a schematic diagram illustrating an example of a change of the coded data amount generated by the moving image coding unit 202. Referring to FIG. 15, reference numeral 242 represents the amount of coded data 209 generated by the image coding circuit 208 of the moving image coding unit 202, reference numeral 243 represents the amount of coded data 222 transferred to the optical disc, and reference numeral 244 represents the data transfer capacity determined by the data transfer speed of the optical disc 204. At a scene change, the generated coded data amount 242 becomes very large as shown by a broken line. Therefore, it may become impossible to process data by the image decoding circuit 229 of the moving image decoding unit 225 which must perform a real time operation unlike the moving image coding unit 202. In view of this, according to the conventional technique, this large peak at the scene change has been cut down. In order to avoid this, according to the embodiment method, a fraction of a large amount of coded data at a scene change is pre-transferred. Namely, a fraction of coded data at the peak area indicated by a broken line is pre-transferred to the hatched area so that the coded data amount 243 to be transferred to the optical disc becomes as shown by a solid line.

Figure 16:
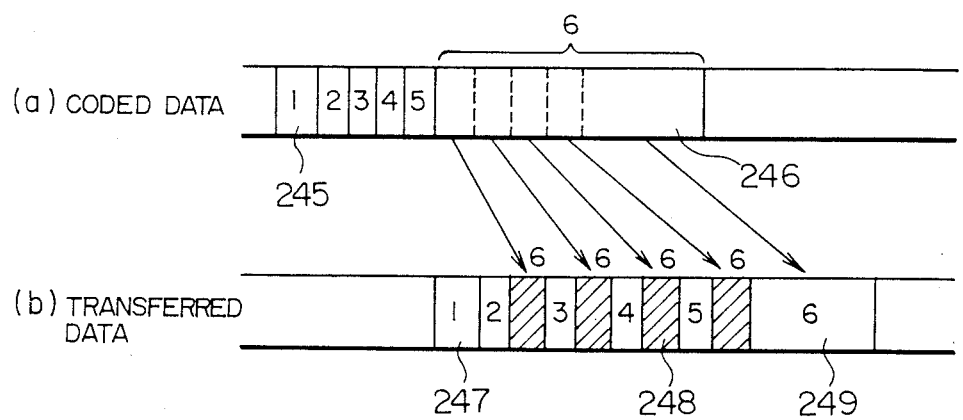
FIGS. 16(a) and (b) are schematics diagram showing a flow of coded data in the moving image coding unit of the third embodiment of the present invention.

FIG. 16 is a schematic diagram used for explaining the flow of coded data at the moving image coding unit 202. FIG. 16(a) shows the flow of coded data 209 outputted from the image coding circuit 208, and FIG. 16(b) shows the flow of coded data sent to the optical disc 204. Ordinary frame coded data 245 is sent to the optical disc 204 as coded data 247 similar to the data 245. However, hatched fractions 248 of scene change coded data 246 are pre-transferred when preceding several frame coded data are transferred, and the remaining coded data 249 is transferred thereafter. The pre-transferred coded data is decoded at that time by the image decoding circuit 229 of the moving image decoding unit 225 and is maintained stored until the real scene change frame arrives. Consequently, the amount of coded data to be decoded upon arrival of the scene change frame becomes small, with the data processing capability of the image decoding circuit being ensured. Thus, a high quality of image for a scene change frame as well as for an ordinary frame can be obtained.

In the above embodiment, a plurality of code memories 212 to 214 have been used for storage of respective frame coded data 209 generated by the image coding circuit 208 of the moving image coding unit 202. However, a pipeline architecture may be used wherein the content of each code memory is transferred to the next stage code memory at the end of each frame.

Further, the image coding circuit 208 performs coding of those blocks whose content have changed to some degree with respect to the preceding frame, i.e., those significant blocks. However, difference data of the significant block from the preceding frame may be coded. In this case, the content of the sub-frame memory 235, into which a fraction of pre-transferred coded data for a scene change frame is decoded by the moving image decoding circuit 229 of the moving image decoding unit 225, is not simply transferred to the main frame memory 234 via the data transfer circuit 238 upon arrival of the scene change, but is transferred and added to the content of the main frame memory 234.

Furthermore, a fraction of coded data for a scene change frame to be pre-transferred is equally divided into several sub-fractions which are inserted into the preceding associated several frame coded data. However, such equal division is not necessarily required. Still further, the embodiment aims at making flat the peak of coded data amount of a single scene change frame. However, it is also possible to make flat the peaks of coded data amounts of a plurality of adjacent scene change frames.

If the data processing capability of the image decoding circuit 229 is sufficiently high, then the following arrangement may be adopted. Namely, a fraction of pre-transferred coded data of a scene change frame is stored in another buffer memory additionally provided in front of the buffer memory 228 of the moving image coding unit 225. Upon arrival of the remaining coded data of the scene change frame, the previously stored fraction of the coded data of the scene change frame together with the remaining coded data are expanded by the image decoding circuit 229. With such a circuit arrangement, the coded data amount and its change within the buffer memory 228 becomes small to thus allow a smaller capacity of the buffer memory 228.

In the above embodiments, an optical disc such as a CD-ROM has been used as the recording medium wherein moving image data is compressed and coded to write them in the optical disc, and coded moving image data read out from the optical disc is expanded and reproduced. However, other recording medium may be used, such as hard disks, floppy disks and the like. Further, if a delay time of data transfer via a communication line over several frames does not cause any problems, the present invention is also applicable to a moving image data transfer system, using such a communication line.

As appreciated from the foregoing description of the present invention, image data for a plurality of frames are coded, and a change of the coded data amount is smoothed. In addition, means is provided for controlling the data transfer speed to the transmission medium in accordance with the coded data amount. Therefore, data transfer can be realized with higher image quality than conventional. Further, the amount of data to be transferred can be reduced on condition that an image quality of the same order as conventional is allowed. Accordingly, with a given total amount of transferable data, data transfer for moving images can be realized for a longer period than conventional.

What is claimed is:

1. An image data transfer method comprising the steps of:
    transforming an input video signal into image data through sampling and quantization;
    coding said image data using a predetermined image coding method;
    transferring the coded image data to a transmission medium;
    decoding said coded data transferred by said transmission medium using a predetermined image decoding method; and
    reproducing said decoded data into the original video signal;
    wherein a data transfer speed for transferring coded image data to the transmission medium is selected such that the total coded data for said input video signal over a predetermined time duration becomes equal to or smaller than a transferable data amount determined by a data transfer speed at the time of decoding said coded data from said transmission medium and by said predetermined time duration; and
    data transfer information on said selected data transfer speed is transferred to said transmission medium along with said coded data.

2. An image data transfer method according to claim 1, wherein in transferring image data containing both slowly and rapidly moving images,
    the coded data amount is reduced for transfer of said slowly moving image, whereas the coded data amount is increased for transfer of said rapidly moving image.

3. An image data transfer method according to claim 1, wherein image data for a plurality of frames are coded to generate coded data, an average data amount of said coded data is calculated, and the data transfer speed is changed in accordance with said average data amount.

4. An image data transfer method according to claim 1, wherein image data are intermittently transferred through a skip, pause or seek operation.

5. An image data transfer method according to claim 1, wherein said transmission medium is an optical disc.

6. An image data transfer method according to claim 1, wherein said transmission medium is a communication line.

7. An image data transfer method comprising the steps of:
sampling, quantizing and storing an input video signal into a frame memory for transforming said input video signal into image data;
coding said image data using a predetermined image coding method;
storing the coded image data in a code memory;
transferring the coded image data stored in the code memory to a transmission medium;
decoding said coded data transferred by said transmission medium using a predetermined image decoding method; and
reproducing said decoded data into the original video signal;
wherein for image data containing both slowly and rapidly moving images, a fraction of the coded data for said rapidly moving image is filled in the coded data in a code memory corresponding to the remaining portion of the data transfer capacity for said slowly moving image and is pre-transferred with the coded data for said slowly moving image.

8. An image data transfer method according to claim 7, wherein said transmission medium is an optical disc.

9. An image data transfer method according to claim 7, wherein said transmission medium is a communication line.

10. An image data transfer apparatus comprising a moving image coding unit for transforming an input video signal into coded data, and a data transfer unit for transferring said coded data to a transmission medium, said moving image coding unit comprising:
an A/D converter for converting said input video signal subjected to sampling and quantization into digital image data;
a frame memory for storing said digital image data of a plurality of frames; and
an image coding circuit for transforming said digital image data into coded data using a predetermined image coding method;
wherein a data transfer speed is selected such that the total coded data in said transmission medium for said input video signal over a predetermined time duration becomes equal to or smaller than a transferable data amount determined by a data transfer speed for transferring the coded image data from the transmission medium at the time of decoding said coded data and by said predetermined time duration; and
data transfer information on said selected data transfer speed is transferred to said transmission medium along with said coded data.

11. An image data transfer apparatus according to claim 10, wherein said moving image coding unit includes a data transfer speed calculation circuit for calculating an average data amount for said coded data of a plurality of frames, to select a data transfer speed in accordance with said average data amount.

12. An image data transfer apparatus according to claim 10, wherein said moving image coding unit includes a data transfer speed information generating circuit for generating data transfer speed information in accordance with the coded data amount, to control the data transfer through a skip, pause or seek operation in accordance with said data transfer speed information.

13. An image data transfer apparatus according to claim 10, wherein said transmission medium is an optical disc.

14. An image data transfer apparatus according to claim 10, wherein said transmission medium is a communication line.

15. An image data transfer apparatus comprising:
a moving image coding unit for transforming an input video signal into coded data, and a data transfer unit for transferring said coded data to a transmission medium, said moving coding unit comprising:
an A/D converter for converting said input video signal subjected to sampling and quantization into digital image data;
a frame memory for storing said digital image data of a plurality of frames;
an image coding circuit for transforming said digital image data into coded data using a predetermined image coding method;
a plurality of code memories for storing said coded data;
a main frame number generating circuit for determining the oldest coded data as a frame among said coded data stored in said plurality of code memories;
a scene change frame number generating circuit for calculating the coded data amount for each frame to judge if the coded data amount becomes equal to or larger than a predetermined threshold;
a selection circuit for selecting and reading the content of said code memory; and
a multiplexer circuit for multiplexing together the coded data read out from said selection circuit and for outputting the multiplexed coded data therefrom;
wherein for image data containing both slowly and rapidly moving images, a fraction of coded data for said rapidly moving image is filled in the remaining portion of the data transfer capacity for said slowly moving image and is pre-transferred.

16. An image data transfer apparatus according to claim 15, wherein said transmission medium is an optical disc.

17. An image data transfer method according to claim 15, wherein said transmission medium is a communication line.

18. An image data reproduction apparatus comprising a data reproducing unit for reproducing coded data from a transmission medium, and a moving image decoding unit for restoring an original video signal from said coded data reproduced by said data reproducing unit;
wherein a data transfer speed for transferring the coded image data from the transmission medium is changed by controlling said transmission medium in accordance with data transfer speed information added to coded data carried by said transmission medium.

19. An image data reproduction apparatus according to claim 18, wherein said transmission medium is an optical disc.

20. An image data reproduction method according to claim 19, wherein said transmission medium is a communication line.

21. An image data reproduction apparatus, comprising:
- an optical disc reproducing unit for reproducing coded data from a transmission medium of an optical disc, said optical disc reproducing unit comprising:
  - (a) an optical disc drive unit having a motor for driving an optical disc;
  - (b) an optical pickup device for reading data stored in said optical disc;
  - (c) a pre-amplifier for amplifying said data read out by said optical pickup device;
  - (d) a data processing circuit for processing the data outputted from said pre-amplifier to separate said data into coded data and data transfer speed information; and
  - (e) a servo control circuit which performs a servo control whereby said motor of said optical disc drive unit is controlled in accordance with said data transfer speed information outputted from said data processing circuit such that the data transfer speed for said data outputted from said pre-amplifier becomes equal to the value of said data transfer speed information; and
- a moving image decoding unit for restoring an original video signal from said reproduced coded data, said moving image decoding unit comprising:
  - (a) a buffer memory for storing said coded data from said optical disc;
  - (b) an image decoding circuit for decoding said coded data stored in said buffer memory;
  - (c) a frame memory for storing image data from said image decoding circuit; and
  - (d) a D/A converter connected to said frame memory for converting said image data into a video signal.

22. An image data reproduction apparatus according to claim 21, wherein said moving image decoding unit further comprises:
- a data separation circuit for separating the data reproduced by said optical disc reproducing unit into coded data and data transfer speed information; and
- a data transfer control circuit for controlling the data transfer speed for the data reproduced by said optical disc reproducing unit, in accordance with said data transfer speed information.

23. An image data reproduction apparatus comprising an optical disc reproducing unit for reproducing coded data from a transmission medium, and a moving image decoding unit for restoring an original video signal from said reproduced coded data;
said moving image decoding unit comprising:
- a buffer memory for storing said coded data from said transmission medium;
- an image decoding circuit for decoding said coded data stored in said buffer memory;
- a separation circuit for separating image data outputted from said image decoding circuit into main frame image data and a fraction of pre-transferred image data;
- a main frame memory for storing said main frame image data;
- a sub-frame memory for storing a fraction of pre-transferred image data;
- a scene change frame detection circuit for detecting synchronization between said main frame image data and said fraction of pre-transferred image data; and
- a data transfer circuit for transferring said fraction of pre-transferred data in said sub-frame memory to said main frame, in accordance with a synchronization signal from said scene change frame detection circuit.

24. An image data reproduction apparatus according to claim 23, wherein said transmission medium is an optical disc.

25. An image data reproduction apparatus according to claim 23, wherein said transmission medium is a communication line.

26. An image data reproduction apparatus according to claim 18, wherein said data reproducing unit including a data separation means for reading out a data transfer speed information added to said coded data to control the data transfer speed through a skip, pause or seek operation in accordance with said data transfer speed information.

27. An image data reproduction apparatus, comprising;
- an optical disc drive unit having a motor for driving an optical disc;
- an optical pickup device for reading data stored in said optical disc;
- a data separation circuit for separating the data read by said optical pickup device into coded data and data transfer speed information;
- a data transfer control circuit for controlling the data transfer speed for reproduction of the data by control of said motor, in accordance with said data transfer speed information;
- a buffer memory for storing said coded data from said optical disc;
- an image decoding circuit for decoding said coded data stored in said buffer memory;
- a frame memory for storing image data from said image decoding circuit; and
- a D/A converter for converting said image data into a video signal.

28. An image data reproduction apparatus according to claim 27, wherein said transfer speed information relates to one of intermittent readout operations of the data selected from a group comprising a skip operation, a pause operation and a seek operation.

* * * * *